3,060,078
BONDING OF POLYETHYLENE TEREPHTHALATE
FIBERS TO CERTAIN RUBBERS
Everett C. Atwell, Greensboro, N.C., assignor to Burlington Industries, Inc., Greensboro, N.C., a corporation of Delaware
No Drawing. Filed Dec. 2, 1960, Ser. No. 73,220
9 Claims. (Cl. 156—335)

The present invention relates to certain improvements in the bonding of polyethylene terephthalate fibers to chlorosulphonated polyethylene rubber (Hypalon) or polyisobutylene rubber (butyl rubber).

The difficulties involved in obtaining good adhesion between polyethylene terephthalate fibers and various types of rubber, e.g. the chlorosulphonated polyethylene and polyisobutylene rubbers known as Hypalon and butyl rubber, respectively, are well known in the art and numerous proposals have been made for obtaining an improved bond. However, there is still a real need for new methods and techniques which will provide optimum adhesion between these materials.

Accordingly, the principal object of the present invention is to provide a method of bonding polyethylene terephthalate fibers to chlorosulphonated polyethylene rubber or butyl rubber whereby remarkably outstanding adhesion is obtained. A more specific object of the invention is the provision of a unique pretreatment for polyethylene terephthalate fibers to facilitate increased adhesion to the specific synthetic rubbers indicated above. Other objects of the invention will also be hereinafter apparent.

Broadly stated, the invention contemplates the use of two specific primers which, when used consecutively in the manner described, give a surprisingly high bonding effect between the indicated rubbers, or compositions containing same, and polyethylene terephthalate. The first of these primers comprises an organic polyisocyanate such as methylene bis (4-phenylisocyanate). The second primer is an aqueous composition comprising an emulsion or dispersion of a neoprene latex and a partially condensed resorcinol-formaldehyde reaction product, particularly the base catalyzed resole described in my copending applications Serial No. 42,956 or Serial No. 49,179, the subject matter of which is incorporated herein by reference.

The success of the invention is due to the surprising discovery that the two primers used herein are mutually adhesive and coact in an unusual way to give a degree of bonding which is significantly in excess of the expected additive effect based on the use of each primer, separately. As a matter of fact, treatment of the polyethylene terephthalate with either of the primers alone does not result in any commercially important increase in adhesion above that found between untreated polyethylene terephthalate and the indicated rubbers whereas, under otherwise comparable conditions, the method of the present invention increases the adhesion to a commercially significant value which may be many times greater than the adhesion between the untreated materials.

In carrying out the present process, the polyethylene terephthalate fibers in yarn, fabric, or other form, are first impregnated with an organic solvent solution of the organic polyisocyanate. For this purpose, there is used a solution of the polyisocyanate in moisture-free organic solvent, e.g. chlorinated or alkylated aromatics such as monochlorobenzene, xylene or toluene. While the amount of isocyanate can be widely varied, it is usually desirable to apply a minimum of 0.5% polyisocyanate solids based on the weight of dry polyethylene terephthalate fibers. An economical and usually practical level is 2.0 to 2.5%. A maximum of 5% is usually in excess and does not provide further improvement.

As indicated above, methylene bis (4-phenylisocyanate) is a typical polyisocyanate suitable for priming polyethylene terephthalate fibers according to the invention. Monoisocyanates are unsatisfactory but other organic polyisocyanates which may be used are polymethylene polyphenyl polyisocyanate having the formula:

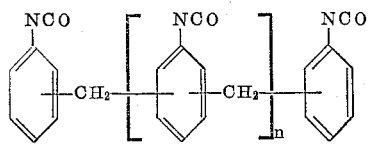

wherein $n$ is an integer, e.g. the product known as PAPI-1 (Carwin Company), in which $n$ has an average value of 1; Mobay's toluene diisocyanate polymer Mondur CB-60; triphenylmethane triisocyanate (Mondur TM); 3,3-di-methoxyl-4,4'-biphenylene diisocyanate; and p,p'di-phenylmethane diisocyanate (Mondur MO).

After the polyisocyanate has been applied as the first primer, the treated polyethylene terephthalate fibers are dried for solvent removal prior to application of the second primer. Usually, the treated material is heated until dry, using temperatures between 200–300° F. The dried, isocyanate treated polyethylene terephthalate fibers may then be treated, either immediately or after storage, with the second primer of the invention. Advantageously, the dried isocyanate-treated material is tack-free and may be rolled up and stored without need for subsequent reactivation of the primer and without detriment to the working properties of the material.

As indicated heretofore, the second primer comprises an aqueous emulsion or dispersion of neoprene latex and an resole according to my above mentioned applications Serial No. 42,956 and Serial No. 49,179. This primer may be prepared as described in said applications by substituting the indicated neoprene latex for the butadiene-acrylonitrile latex used in said applications. The resole used herein is identical with the resole of said pending applications and is prepared by partial reaction of resorcinol and formaldehyde using a basic catalyst in the manner indicated.

It is possible to include an organic solvent in the second primer although organic solvent-free aqueous compositions are preferred. Zinc oxide or other chlorine acceptor (5–15% on the weight of latex solids) is desirably included in this composition. Softening, wetting and antifoaming agents constitute additional optional components.

Any commercially available neoprene latex may be used in making up the resole/neoprene latex composition which constitutes the second primer of the invention. A typically suitable latex is available under the trade name "Neoprene latex 571."

The second primer (resole/neoprene latex) may be applied to the isocyanate-treated polyethylene terephthalate fibers in any convenient fashion, e.g. by dipping, padding or spraying. The amount of resole/neoprene primer applied to the polyethylene terephthalate fibers will vary depending, for example, upon the weight and construction of the polyethylene terephthalate material. Typically, the amount of add-on solids to be applied will be at least 5% by weight of the fibers with 15% a practical upper limit although higher percentages, for example, 30% or even more, may be used. In any event, it will be realized that the specific amount of add-on solids necessary to give maximum mutual bonding will vary from one situation to another. Usually, the ratio of resole to latex solids, in parts of solids by weight, will come within the range of from about 1:12 to 1:2.5, preferably 1 part resole solids per 3.5 to 10 parts latex solids.

After impregnation, the water should be removed from the goods by drying. Various drying temperatures and drying rates may be used so long as the fibrous material is completely dried. It is also advantageous to subject the dried material to a final cure at 290 to 300° F., for 30 to 45 minutes, to remove all traces of moisture and to fully polymerize and crosslink the resin/latex solids.

The dried, dual primed polyethylene terephathalate, with or without further curing as described above, is also characterized by its non-tacky nature and can be rolled up and stored for long periods of time without losing its bonding affinity for the rubber. As will be appreciated, this represents an outstanding advantage since the dual primed fibrous material can be stored until the rubber is to be applied thereto. Another unique feature of the dried material is that, even after long storage, no reactivation of the treated fabric surface is necessary for effective bonding with rubber. This is in contrast to known adhesive treated fabrics wherein reactivation, for example, by organic solvent treatment or water, is essential to effect bonding after storage.

The dual primed polyethylene terephthalate fibers, in fabric form or otherwise, may be bonded to conventional vulcanizable chlorosulphonated polyethylene or butyl rubber compositions. Chlorosulphonated polyethylene rubber has outstanding resistance to attack by oil and ozone and excellent color stability and resistance to heat and chemicals. Accordingly, this rubber is useful for making belts for use in heated areas, hose for transfer of chemicals and molded products. Hypalon S-2 elastomer is a typical chlorosulphonated polyethylene rubber and this is available, for example, as hose stock including the usual metallic oxide accelerator and organic acid. A representative composition may comprise:

| | Parts |
|---|---|
| Hypalon (or butyl rubber) | 100 |
| Zinc oxide | 5-20 |
| Sulfur | 2-3 |
| Stearic acid | 1 |
| Accelerator | 1-2 |

The rubber may be applied to the dual treated polyethylene terephthalate in conventional fashion. Thus, for example, butyl rubber in sheet form may be pressed against the dual primed polyethylene terephthalate fabric prepared according to the invention and vulcanized under conventional conditions (e.g. 290° F. to 300° F. and desirably 125 to 250 p.s.i. pressure for 30 to 45 minutes).

The invention is illustrated, but not limited, by the following examples wherein parts and percentages are by weight unless otherwise stated:

EXAMPLE I

This example describes the preparation of a suitable resole/latex composition suitable for use herein as the second primer.

*Resole/Latex Primer*

PART A

| | Parts |
|---|---|
| Resorcinol | 5.1 |
| 37% formaldehyde | 6.5 |
| NaOH flakes | .15-.30 |
| Water | 110 |
| (6.25% resin solution) approximately | 122 |

PART B

| | |
|---|---|
| 6.25% resin solution (Part A) | 274.0 |
| 55% neoprene latex 571 | 102.0 |
| 56.8% zinc oxide paste | 10.5 |
| Water | 48.5 |
| | 435.0 |

*Preparation of Part A*

90% of the water for Part A was measured into the resin preparation tank. The caustic soda flakes were added and the mixture stirred until the caustic was dissolved. The resorcinol was then added and dissolved by stirring. The formaldehyde and balance of the water were then added, the temperature of the water having been previously adjusted to 80° F. The resulting mixture was aged for 6 hours under controlled temperature conditions of 80-84° F. At the end of the 6 hours, the resulting resole resin solution (Part A) was used in the preparation of the bonding composition (Part B).

*Preparation of Part B*

The neoprene latex was measured into a mixing tank with stirring. The zinc oxide paste was added and the resin solution (Part A) and water (desirably with sufficient $NH_4OH$ to give a pH above 9, e.g. 9.6) were then slowly added. As described in Serial No. 42,956, the pH of the resole/latex dispersion is desirably kept above 9 to insure against gelation of the latex.

The resulting dispersion (18% solids) was ready for immediate use but may be stored for a limited time (about 2 days) at room temperature, or, for prolonged periods of time under refrigeration.

EXAMPLE II

The resole/neoprene latex primer of Example I was also prepared by repeating Example I except that Part A of the bonding composition was prepared in two separate stages. First, a so-called "arrested resin solution" was prepared using the following proportions:

| | Parts |
|---|---|
| Resorcinol | 5.1 |
| NaOH flakes | .3 |
| 37% formaldehyde | 2.15 |
| Water | 4.9 |
| | 12.45 |

This arrested solution was prepared by first adding the water to a suitable tank or drum. The NaOH flakes were then added and dissolved by stirring followed by addition and dissolution of the resorcinol. Thereafter, the formaldehyde was added, considerable heat being generated. The tank was cooled to prevent boiling and, after allowing the contents to cool, the resulting composition was stored in stainless steel or lined drums sealed to prevent entrance of air. This composition may be stored for an indefinite period of time as compared to not more than about 20 hours for the Part A composition of Example I.

The required amount of the arrested resin solution (12.45) parts was transferred from the storage drum to the reaction tank. To this arrested resin solution was added 4.3 parts of 37% formaldehyde and 108 parts of water, the water being added first, with agitation. The resulting mixture was aged for from 1-6 hours at 80-84° F.

After the aging period, a dispersion with neoprene latex was prepared as in Example I.

EXAMPLE III

This example illustrates preparation of a dual primed polyethylene terephthalate fabric and the bonding thereof to chlorosulphonated polyethylene (Hypalon).

A first primer was prepared by dissolving sufficient methylene bis (4-phenylisocyanate), for example Hylene M-50, in xylene freed from moisture to provide a 10% solids solution.

A piece of 5 oz. polyethylene terephthalate (Dacron) fabric was then padded through the xylene solution so as to leave 3-3.5% Hylene solids on the cloth. The fabric was dried at 220° F. for solvent removal.

The thus treated fabric was then run through an 18% aqueous dispersion or emulsion of second primer, prepared according to Example I, and the pad squeeze rolls. This was done two times so as to get a solids add-on of 12–15%. The fabric was dried at 220° F. after each passage through the squeeze rolls. The dried fabric was then subjected to a final cure of 3 to 6 minutes at 320° F. to remove all traces of moisture and to fully polymerize and cross link the resin/latex solids.

Conventionally compounded Hypalon–S sheet (hose stock .040 inch thick) was then pressed into contact with the dual primed fabric and vulcanized at 290° F. for 30 minutes.

It had previously been ascertained that the adhesion between the unprimed Dacron fabric and the Hypalon was only about 2.2–2.6 pounds per inch width on a peel test when the test jaws were separated at a rate of 2″ per minute. Adhesion using only the polyisocyanate primer of this example was the same and with the latex/resole second primer alone, only about 12–14 pounds per inch. In contrast, however, the fabric processed in the manner of the example using both primers as indicated exhibited fabric adhesion to the Hypalon of about 25 pounds per inch width. Essentially equivalent results were obtained using the product of Example II as the second primer.

EXAMPLE IV

Example III was repeated for the purpose of bonding butyl rubber to polyethylene terephthalate fabric using the following formulation as the second primer, same being prepared in the manner outlined above:

| | Parts |
|---|---|
| 50% neoprene latex 571 | 85.5 |
| 6.25% resin solution (Part A of Example II) | 273.7 |
| 56.8% zinc oxide paste | 10.5 |
| 28% aqua ammonia | 13.6 |
| Water | 16.8 |
| (pH about 9.6), approximately | 400 |

A conventional butyl rubber sheet was bonded to the dual primed polyethylene terephthalate fabric in the manner of Example III to give adhesion of 23.9 compared to 3.5 for no primer, 5.6 for polyisocyanate primer alone and 12.9 for the latex primer alone.

It will be appreciated that various modifications may be made in the invention described herein. For instance, any of the other organic polyisocyanates referred to above may be substituted for the Hylene M50 utilized in the foregoing examples. Accordingly, the scope of the invention is defined in the following claims wherein I claim:

1. In a process for bonding polyethylene terephthalate fibers to a rubber selected from the group consisting of chlorosulphonated polyethylene rubber and butyl rubber, the improvement which comprises first treating said polyethylene terephthalate fibers with an organic polyisocyanate and then with a composition containing resorcinol-formaldehyde and a neoprene latex, prior to application of said rubber thereto.

2. In a process for bonding polyethylene terephthalate fibers to a rubber selected from the group consisting of chlorosulphonated polyethylene rubber and butyl rubber, the improvement which comprises first treating said polyethylene terephthalate fibers with an organic solvent solution of an organic polyisocyanate, drying the thus treated polyethylene terephthalate fibers, then treating said fibers with an aqueous, organic solvent-free composition including a resole and a neoprene latex and again drying the thus treated material, said treating and drying steps preceding the application of the rubber to said polyethylene terephthalate.

3. The process of claim 2 wherein said rubber is butyl rubber.

4. The process of claim 2 wherein said rubber is chlorosulphonated polyethylene rubber.

5. The process of claim 2 including the further step of applying said rubber to the dried, dual treated polyethylene terephthalate fibers and then vulcanizing the same.

6. The process of claim 2 wherein the amount of polyisocyanate applied to said polyethylene terephthalate is at least 0.5%, based on the weight of dry fibers and the amount of latex/resole composition is at least 5%, based on the weight of the dry fibers.

7. The process of claim 2 wherein said dried, dual treated fibers are heat cured prior to application of said rubber thereto.

8. The product obtained by the process of claim 2.

9. The product obtained by the process of claim 5.

References Cited in the file of this patent

UNITED STATES PATENTS

| 2,990,313 | Knowles et al. | June 27, 1961 |
| 2,991,258 | Nobbs et al. | July 4, 1961 |

FOREIGN PATENTS

| 595,290 | Great Britain | Dec. 1, 1947 |